Patented Oct. 17, 1933

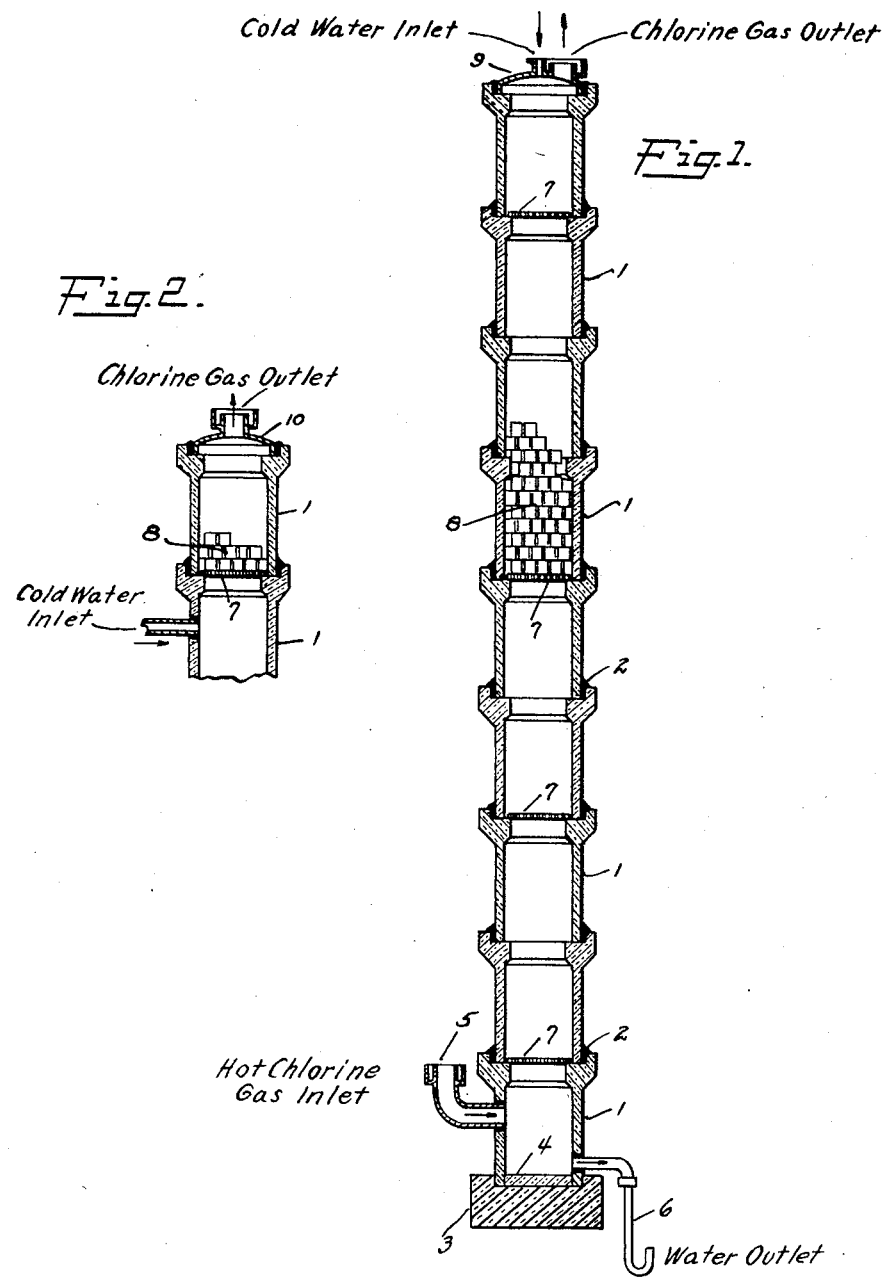

1,930,526

UNITED STATES PATENT OFFICE 1,930,526

PROCESS AND APPARATUS FOR DRYING CHLORINE

Coke S. Lykes, Syracuse, N. Y., assignor to The Solvay Process Company, Solvay, N. Y., a corporation of New York Application May 21, 1929. Serial No. 364,868

5 Claims. (Cl. 23—219)

This invention relates to the drying of chlorine gas, and has for its object the provision of an improved method of drying chlorine and an apparatus suited for the conduct of such method.

In the electrolytic production of chlorine by decomposition of a sodium chloride solution, the chlorine gas passes off at a comparatively high temperature and carries with it a considerable amount of moisture. Where the gas thus produced is to be used in the manufacture of liquid chlorine, it is essential that as much of this moisture be removed as possible.

To effect this removal of moisture, the wet chlorine gas from the electrolytic cells is, according to the practice generally employed, passed through stoneware coils or manifold piping over which a suitable cooling medium, such as water, is allowed to flow, thereby bringing the moisture in the gas to near equilibrium at the temperature attained during the cooling. After this treatment, the chlorine is passed through sulfuric acid to complete the drying before undergoing liquefaction. Such a system of stoneware piping, however, possesses a number of disadvantages, which it is desirable to overcome, among which are the low efficiency of heat transfer through the walls of the piping and the high cost of maintaining an apparatus constructed of a material such as stoneware which is very susceptible to breakage under stress and shocks.

In order to obtain more efficient and economical operation and drying of the chlorine gas, the present invention provides for a process and apparatus in which the chlorine is brought into direct contact with a cool medium to effect preliminary drying of the gas, after which it is further dried by passage through sulfuric acid.

For carrying out the process of my invention an apparatus may be employed which is simpler and more permanent than a stoneware piping arrangement, and which leads to practically no difficulties in the way of breakage. Direct cooling, moreover, necessitates a smaller capital expenditure for apparatus than is incurred through the use of a silica or stone ware indirect cooling system, and adds to the compactness of apparatus layout, thereby rendering operation less difficult and resulting in a higher chlorine output.

Furthermore, direct cooling more thoroughly purges the chlorine gas of carbon dioxide and other impurities resulting from the disintegration and chemical decomposition of the anodes of the electrolytic cells in which the chlorine is produced, and effects a lower discharge temperature than would be obtained by indirect cooling using a medium having the same initial temperature. Direct contact between the mass of gas and the cooling water likewise results in a better separation of condensed moisture from the flowing stream of gas. Accordingly, direct contact of the cooling medium and the gas results in a more complete removal of moisture and a lower consumption of sulfuric acid per unit of chlorine in the final drying of the gas. A considerable saving in the cost of this final drying stage and therefore of the whole process is thus obtained.

In carrying out a process of drying chlorine gas by direct contact with a cooling medium according to the present invention, the chlorine gas may be passed through a tower packing through which the cooling medium is directed in counter-flow and in direct contact with the gas. The tower may be made of suitable dimensions and constructed of such materials as experience shows to be most satisfactory for the purpose.

As an example of one form of apparatus which may be employed, reference is made to the accompanying drawing, wherein Fig. 1 represents in cross section, an elevation of a form of tower in accordance with the invention, and Fig. 2 represents a detail view of a modification.

Considering the drawing more in detail, Fig. 1 illustrates a tower made up of a plurality of superposed cylindrical sections 1, composed of concrete or other suitable material and provided with packing 2 for sealing the contiguous edges of adjoining sections. The tower structure may be mounted, if desired, on a base 3, laid with vitrified paving brick 4, and is provided at its lower end with a chlorine gas inlet 5 and a cooling water outlet 6. At suitable intervals, perforated stone ware plates 7 are arranged for supporting the packing 8 extending throughout the tower, and at its upper end the tower is closed with a cover plate 9, provided with a cooling water inlet and a chlorine gas outlet.

In drying chlorine gas in accordance with my invention by direct contact with cooling water in the apparatus described, the hot chlorine gas supplied to the bottom of the tower passes up through the packing against a downward flow of cool water fed in at the top. The amount of water employed is, of course, dependent upon the temperature of the supplied chlorine, which usually will be somewhere between 40° C. and 70° C., if the chlorine is supplied directly from a tank of electrolytic cells. The temperature to which the chlorine is to be cooled by the water is governed by the tendency of the chlorine to form chlorine hydrate at temperatures below 9° C. If the chlorine is cooled below this point, crystals of chlorine hydrate will be deposited, tending to plug the orifices, openings and pipes of the apparatus. For this reason, it is advisable to set 10° C. as the lower limit to which the chlorine is to be cooled and to regulate the drying operation carried on in the tower accordingly. In actual operations, it has been found that a satisfactory drying of the gases from electrolytic cells is obtained when they are cooled to a temperature between about 10° C. and 20° C.

The modied form of tower top shown in Fig. 2, differs from that shown in Fig. 1 in that the cool water inlet is located at some distance below the top of the tower, so that a portion of the packing 8 arranged above the level of the inlet may act as a separator for any spray which might be carried up with the chlorine gas. The top of the tower, accordingly, is fitted with a cover plate 10, similar to the cover plate 9 of Fig. 1 except that it is provided only with a chlorine gas outlet.

I claim:

1. The process of drying wet chlorine gas which comprises bringing said gas into direct contact with a quantity of cooling water substantially free from materials foreign to said chlorine gas and then contacting the thus treated gas with sulfuric acid.

2. The process of drying wet chlorine gas which comprises bringing said gas into direct contact with a quantity of cooling water at a temperature between about 10° C. and 20° C. and then contacting the thus treated gas with sulfuric acid, said cooling water being substantially free from materials foreign to said chlorine gas.

3. The process for drying and simultaneously cooling wet chlorine gas containing a proportion of water in excess of that required to saturate the gas at the temperature to which it is to be cooled, which process comprises bringing said gas into direct contact with a quantity of cooling water at a temperature above the temperature of formation of chlorine hydrate, said cooling water being substantially free from materials foreign to said chlorine gas.

4. The process for drying and simultaneously cooling wet chlorine gas having a moisture content in excess of that of the saturated gas at the temperature to which the gas is to be cooled, which process comprises bringing said gas into direct contact with a quantity of cooling water at a temperature between about 10° C. and about 20° C., said cooling water being substantially free from material foreign to said chlorine gas.

5. The process for drying and cooling chlorine gas substantially saturated with water vapor and at a temperature of between about 40° C. and about 70° C., which comprises bringing said gas into direct contact with a quantity of water at a temperature between about 10° C. and about 20° C., said water being substantially free from material foreign to said chlorine gas.

COKE S. LYKES.